Nov. 24, 1964 W. C. SAUDER 3,158,798

CHEMICAL MEMORY CELL

Filed Nov. 17, 1959

INVENTOR.
WILLIAM C. SAUDER

BY Wade Koontz and Sherman H. Goldman
ATTORNEYS

United States Patent Office 3,158,798
Patented Nov. 24, 1964

3,158,798
CHEMICAL MEMORY CELL
William C. Sauder, Lexington, Va.
(248 Stanmore Road, Baltimore, Md.)
Filed Nov. 17, 1959, Ser. No. 853,664
4 Claims. (Cl. 317—231)
(Granted under Title 35, U.S. Code (1952), sec. 266)

The invention described herein may be manufactured and used by or for the United States Government for governmental purposes without payment to me of any royalty thereon.

This invention relates to an electrical data storage element and more particularly relates to a chemical memory element or cell suitable for use in storage circuits, switching systems and, particularly, the memory section of a digital computer.

Various types of memory systems or elements have been employed in the past. For example, magnetic drums, magnetic tapes, ferromagnetic cells and ferroelectric cells have proved useful. However, those systems pose problems in eddy current losses, significant power requirements, resolution, the use of moving parts, and weight and space requirements for the installation of such systems.

Accordingly, it is a principal object of this invention to circumvent the above-described problems so as to produce a memory element which will operate effectively in storage and counting circuits of various types.

Another object of this invention is to provide a chemical memory element capable of existing in two potential states that are chemically distinct.

Still another object of this invention is to provide a chemical memory element for converting voltage pulses to digit signals of binary code numbers whereby the recording, reproduction and storage of such signals are effectuated in a simplified manner without deterioration.

A further object of this invention is to provide a chemical memory element which is light in weight and occupies a small volume per memory bit thereby being particularly suitable for use in airborne computer applications.

A still further object is to provide a chemical memory element which is simple in construction without moving parts.

The above and still other objects of this invention will become readily apparent and clearly understood from the following detailed description of specific embodiments thereof, especially when read in conjunction with the accompanying drawings, in which.

In all figures, like numerals or letters designate like elements or materials.

It has been found that the aforestated objects are accomplished by utilizing a chemical memory element cell which employs a plurality of metallic switching electrodes, a single electrode common to all of the switching electrodes and an electrolyte in which the electrodes are immersed. The operation of the chemical memory cell of this invention is based upon the principle that a circuit which includes an anode and a cathode, both being of the reversible type, and a suitable electrolytic solution provides a chemical cell which is capable of existing in either one of two distinct potential states, depending upon which way a flow of electric current passes through the circuit.

In the application of this cell as a memory unit, one particular cell potential state may represent the digit zero while the other potential state represents the digit one of the binary code system. Thus, by employing a plurality of anodes, each having one "memory bit" induced thereon, and a single cathode common to all of the anodes, it becomes apparent that a very compact memory unit may be constructed in which the number of "memory bits" are limited only by the number of anodes which can be confined to a given unit area.

Figure 1:
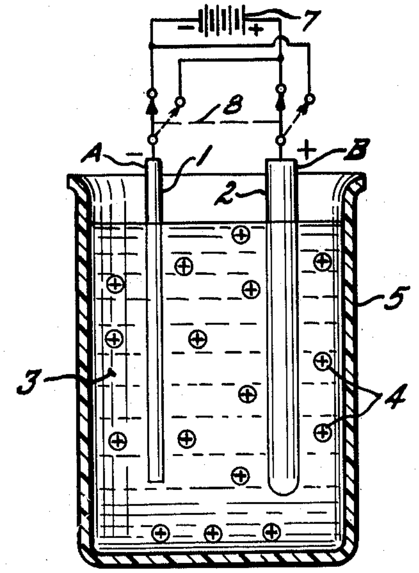
FIGURE 1 is a cross-sectional view illustrating one embodiment of the chemical memory element of this invention.

Referring to FIGURE 1, in more detail, there is disclosed one embodiment of the chemical memory cell of this invention which comprises an anode or switching electrode 1 composed of a metal A, a cathode or second electrode 2 which may be composed of metal, an amalgam or a metal-metallic salt combination designated herein as B, a suitable electrolytic solution 3 which contains or to which has been added a metallic ion 4, a suitable container or cell wall 5, a suitable source of electric current 7, and a switching circuit 8. The metallic ion 4 must differ from and stand higher in the electromotive force series than the metal A of switching electrode 1.

The chemical memory cell will exhibit a characteristic electromotive force, hereinafter designated as E.M.F., which may be zero depending upon the specific materials employed.

The characteristic E.M.F. of the cell is produced by the potentials existing at the electrodes as a result of the chemical interaction of metal A of switching electrode 1, metal B of electrode 2 and electrolyte 3, and by any junction potentials within the cell. In general, junction potentials within a cell are very small when compared with electrode potentials to the extent that the effect of such junction potentials is negligible. Thus, a discussion of junction potentials is not necessary for an understanding of this invention and, accordingly, will not be commented upon. The metallic ion 4 will not enter into the reaction at this point and the cell will be in its inactive state with the switching electrode 1 exerting a positive potential and electrode 2 exerting a negative potential. The operation or activation of the memory cell is effectuated by passing an electric current from a suitable external source 7 through a switching means 8 in such a direction as to cause electrode 1 to have a negative polarity with respect to electrode 2. The passage of the electric current, in the manner described above, will result in electrode 1 being plated by metallic ions 4 by means of electrodeposition. As a result, the chemical memory cell will exhibit a second and new characteristic E.M.F. which will be determined by the chemical interaction of metallic ion 4 now plated on electrode 1 as neutral atoms, the metal B of electrode 2 and electrolyte 3. The cell will continue to exert the second E.M.F. until the plating on electrode 1 is removed.

Figure 2:
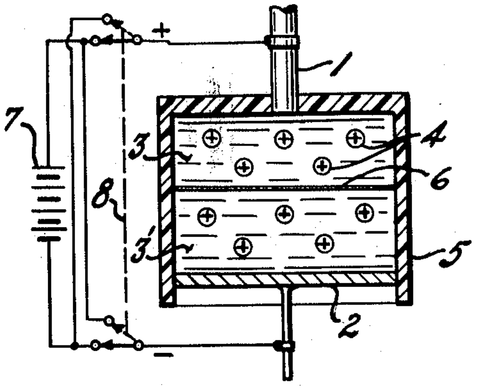
FIGURE 2 is a cross-sectional view illustrating a further embodiment of the chemical memory element of this invention.

Transition from one cell potential to another is effectuated by removing the electroplated metal 4 from switching electrode 1. The removal of metal 4 may be achieved in a number of ways so that the cell may revert to its first or original characteristic E.M.F. For example, an electric current from source 7 may be passed from switching electrode 1 to electrode 2 by employing switching means 8 in such a manner that electrode 1 exhibits a positive polarity with respect to electrode 2 thereby causing the electroplated metal 4 to go back into solution as metallic ions. Removal of the plated metal 4 by passing an electric current through the circuitry of the cell to switch the cell to its inactivated state is a preferred method of removal and the one employed in the operation of this memory cell. Other methods may be employed, but are not as desirable. For example the electroplated metal 4 will also be removed if a current is drawn from the cell. Thus, if it is considered desirable for the cell to maintain its activated state for long periods of time, the cell must be connected to a conventional high impedance means to prevent large currents from being drawn from the cell. Accordingly, care must be employed to assure that associated "read out" circuits are of high impedance. A further method for removing the electroplated metal 4 from electrode 1 is illustrated when a metallic ion exists in the electrolyte surrounding the switching electrode 1 which is lower in the electromotive force series than metal A of switching electrode 1, thus causing the metal A to go into solution to replace the lower metallic ion. The presence of the lower metallic ion will not only result in shorter "read times" for the activated state of the cell but may also result in poisoning the electrolyte because of an excess of metallic ions from metal A going into solution, thus impeding the operation of the cell. These difficulties may be eliminated by employing materials which will not poison the electrolyte, or by constructing a cell so that the switching eletcrode and the lower metallic ion are chemically separated. FIGURE 2 is an illustration of the type of construction which may be employed to eliminate the above difficulties comprising a porous membrane 6 which will chemically separate switching electrode 1 and the ion in question. The porous membrane inhibits mixing of the solutions but allows ions to be transported through.

Specific example of the memory cell of this invention is illustrated by again referring to FIGURE 2 which comprises a copper switching electrode 1, a silver electrode 2, a heavy clay porous membrane 6 which separates the cell into two sections, an electrolytic solution 3 comprising zinc chloride located adjacent to and in contact with the copper electrode, an electrolytic solution 3 of silver chloride and zinc chloride located in the section adjacent to and in contact with the silver electrode and a suitable container or cell wall 5. The heavy clay porous membrane 6 is a necessary feature of the above described memory cell because of the fact that copper stands higher in the electromotive force series than silver. If the membrane were not employed, copper would go into solution to replace the silver ions and the electrolyte would be poisoned thus impeding the operation of the cell. It becomes obvious, therefore, that the use of a metal for electrode 2 which is not lower than the metal of electrode 1 would eliminate the necessity of a separating membrane.

The activation of the cell is effectuated by passing an electric current from source 7 through switching means 8 and thence through the circuitry of the cell. The copper metal will initially form the positive electrode while the silver metal and silver chloride will form the negative electrode. When the electric current is passed through the circuitry of the cell, the potential exerted by the electrodes will be reversed with the copper electrode negative and the silver electrode positive. Consequently, the zinc ions from the zinc chloride will plate onto the copper electrode as neutral atoms in accordance with the following formula:

(1) $Zn^{++}+2e^{-}\rightarrow Zn^{0}$

As a result a cell is formed in which the silver-silver chloride electrode exerts a positive potential with respect to the negative potential now exerted by the zinc plated copper electrode. This cell will exert a standard E.M.F of +0.9836 volt illustrated by the following half reactions calculated at one molar concentration of the particular ion in solution:

(2) $Zn^{0}\rightarrow Zn^{++}+2e^{-}$ $E_2=+0.7611$ v.

(3) $AgCl^{0}+e^{-}\rightarrow Ag^{0}+Cl^{-}$ $E_3=+0.2225$ v.

Adding algebraically the electrode potentials of the cell, the resulting standard cell potential is as follows:

$$E=E_2+E_3=+0.9836 \text{ volt}$$

The inactivation of the cell is preferably brought about by reversing the electric current from source 7 by means of switching circuit 8 so that said current passes from the zinc plated copper electrode to the silver electrode. The zinc plating will be removed from the copper electrode. In addition, some copper ions from the copper electrode will be forced into the electrolyte thus converting the cell to a copper-silver cell which will exert a standard characteristic E.M.F. of +0.1216 volt as illustrated by the following half reactions calculated at one molar concentration of the particular ion in solution:

(4) $Cu^{++}+2e^{-}\rightarrow Cu^{0}$ $E_4=+0.3441$ v.

(5) $Ag^{0}+Cl^{-}\rightarrow AgCl^{0}+e^{-}$ $E_5=-0.2225$ v.

Adding algebraically the electrode potentials of the copper-silver cell results in a standard cell potential of $$E=E_4+E_5=+0.1216 \text{ v.}$$

Thus, it becomes apparent that by alternating and switching the direction of the flow of electric current, there is produced a chemical memory cell which is capable of existing in two potential states which are chemically distinct. The cell exerts a characteristic E.M.F. which may be caused to exert a second E.M.F. by passing a current through the circuitry of the cell so as to cause the swicthing electrode to be negative in polarity. The second E.M.F. results from the electroplating action at the switching electrode and the cell will exert this second E.M.F. until the plating on the switching electrode is removed.

A further example of a memory cell which has proved to be of special value and simple in construction is illustrated by again referring to FIGURE 1 in which the switching electrode 1 and electrode 2 both consist of copper and electrolyte 3 is a solution of zinc chloride. In this type of cell the necessity for a porous membrane has been eliminated since there are no ions in solution which are below copper in the electromotive series. This cell exerts a zero potential until activated by passing an electric current through the circuitry of the cell in the same manner as described in connection with the copper-silver cell. Upon activation, the zinc ions will plate onto copper electrode 1 which will then exert a negative potential. In addition, copper ions will be removed from copper electrode 2. The cell half reactions are illustrated as follows, calculated at one molar concentration of the particular ion in solution:

(6) $Zn^{0}\rightarrow Zn^{++}+2e^{-}$ $E_6=+0.7611$ v.

(7) $Cu^{++}+2e^{-}\rightarrow Cu^{0}$ $E_7=+0.3441$ v.

The resulting activated cell will have a standard cell potential of:

$$E=E_6+E_7=1.1052 \text{ volts}$$

This cell can be converted back to its original zero potential by reversing the direction of the flow of electric current in the same manner as previously explained in connection with the copper-silver cell.

The electrodes of the chemical memory cell disclosed herein are considered to contain a substance in equilibrium with free ions related to the electrode and consist of a piece of metal immersed in a suitable electrolytic solution containing free ions of the metal. The electrode potential is caused by a tendency of the metal to pass into or out of the ionic state. Thus the electrodes may consist of metals such as zinc, cadmium, iron, nickel or silver;

amalgams such as cadmium-mercury or sodium-mercury; or metal-metallic salt combinations such as a silver metal core surrounded by a silver chloride paste, as well as other materials which are electrochemical cells. The electrolyte performs the function of electrically and chemically joining the electrodes of the cell. A distinctive feature of the memory cell lies in the fact that the electrolytic solution contains a metallic ion which is higher in the electromotive force series than the metal of the switching electrode thus enabling a change in the potential of the switching electrode as a result of the electrochemical plating action which takes place thereon. Accordingly, the memory cell can exist in two distinct potential states, the existence of which can be effectively controlled by switching from one potential to another in order to produce an activated or inactivated state, each of which state will exert its own characteristic E.M.F. and may be utilized to represent a digit signal of the binary code.

In most instances it is desirable that the switching time of the cell be as short as possible, while the "read-time" for the activated state should be as long as possible. The "read-time" refers to the length of time that the cell will remain in the potential state caused by the plating of the metallic ion onto the switching electrode.

Figure 3:
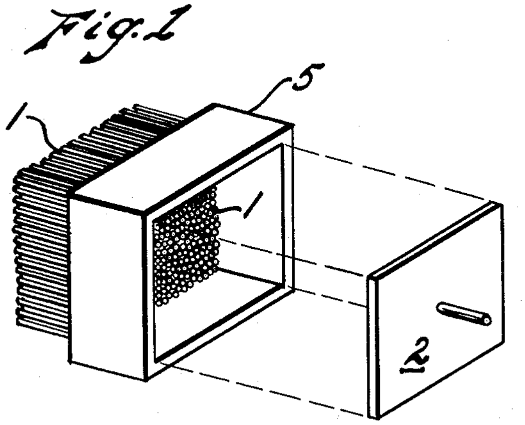
FIGURE 3 is a view in perspective in exploded form showing a compact arrangement of a plurality of the chemical memory elements of this invention.

These times are dependent upon the thickness of the plating which occurs at the switching electrode. The thicker the plating, the greater must be the current passed through the circuitry of the cell in order to bring about a transition from one cell potential state to another, and, consequently, the longer the cell will remain in the activated state for a given set of conditions. The plating thickness which will be acquired by the switching electrode depends upon three parameters, namely, the area of the switching electrode, the magnitude of the switching current and the duration of the switching current. Accordingly, in order to increase read-time and decrease switching-time, the cell should be designed to eliminate electrolyte poisoning, the switching electrode area should be as small as possible, the switching pulses should be of a high magnitude and a short duration and the associated readout circuits should present a high impedance to the cell. Another important factor is the spacing arrangement of the switching electrodes. The electrodes should be confined to a relatively small volume of area which tends to decrease the electrical resistance of the cell thereby encouraging higher switching currents. Since the switching electrode area and spacing are at a minimum, the volume necesary to contain the switching electrode is also at a minimum, consequently, a very compact memory unit is produced. One method of compactly combining a memory cell of this invention into a memory unit is illustrated in FIGURE 3 which comprises a plurality of switching electrodes 1 composed of the exposed ends of small wire, a second electrode 2 shown separated from the unit which common to the whole memory and a conventional cell wall 5. Thus the compactness of the memory unit as a whole is limited only by the number of switching electrodes 1 which can be confined to a given volume of area without short circuiting and the closeness with which the common electrode 2 can be spaced to the switching electrodes without causing arcing in the memory unit.

Figure 4:
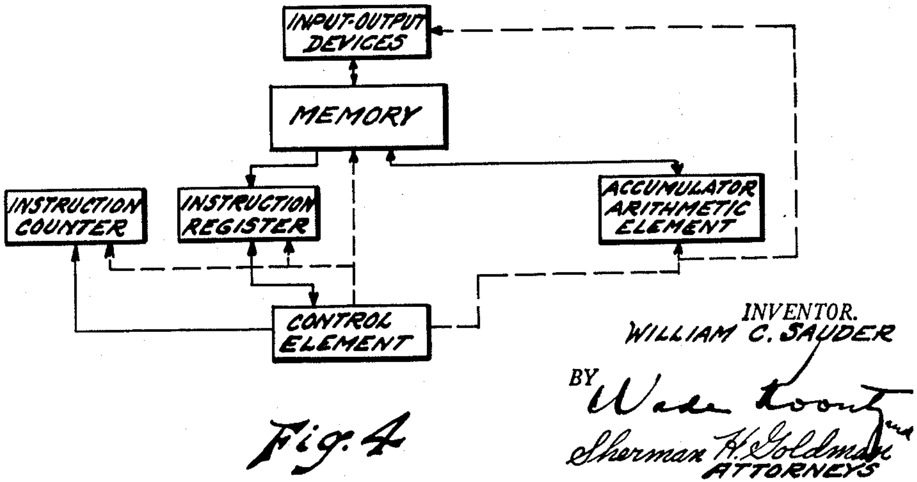
FIGURE 4 is a block diagram of a standard computer circuit showing the integral relation of a computer with a memory unit.

FIGURE 4 is a block diagram of a typical computer showing the interconnection of the basic elements wherein the information paths are represented by solid arrowed lines and the control paths by broken arrowed lines. The memory unit consists of a number of storage locations in which information can be stored and from which information can be extracted. Information stored in the memory unit remains unchanged until it is replaced by new information. The chemical memory cell of this invention, especially that which is exemplified in FIGURE 3, provides for a large number of storage locations which can be effectively utilized for the retention and extraction of information. Consequently, a memory unit is produced which can be employed as the memory element of a typical computer circuit as herein illustrated. The memory unit is particularly adapted to high density memory storage and its use is especially advantageous when viewed in light of the fact that it occupies a small volume per memory bit, that is, the number of bits of memory are limited only by the number of switching electrodes which can be confined in a small volume.

While the invention has been described with particularity in reference to specific embodiments thereof, it is to be clearly understood that the present disclosure of the specific embodiments has been made only by way of example and that numerous changes in the details of construction and the combination and arrangement of parts may be resorted to without departing from the spirit and the scope of the invention as hereinafter claimed.

What is claimed is:

1. A memory unit particularly adapted for use in a computer circuit comprising a container, a plurality of electrochemical circuits mounted within said container, said plurality of electrochemical circuits being capable of existing in either one of two distinct potential states, said plurality of electrochemical circuits comprising a plurality of spaced metallic switching electrodes mounted to extend into said container, a single metallic electrode spaced from said switching electrodes and common to all of said switching electrodes, said single electrode being mounted to extend into said container, said metal of said electrodes being selected from the electromotive series, a metallic ion-containing electrolytic solution, said electrolytic solution comprising a first group and a second group of metallic ions, said first group of metallic ions being in contact with said plurality of switching electrodes and different from and having a higher electromotive activity than the metal of said plurality of switching electrodes and said second group of metallic ions being in contact with said single electrode and similar to the metal of said single electrode, and a porous membrane positioned between said plurality of switching electrodes and said single electrode in order to maintain a separation therebetween.

2. A memory unit in accordance with claim 1 wherein said plurality of switching electrodes are composed of copper, said single electrode is composed of silver, said first group of metallic ions are zinc, and said second group of metallic ions are silver.

3. A memory unit particularly adapted for use in a computer circuit comprising a container, a plurality of electrochemical circuits mounted within said container, said plurality of electrochemical circuits being capable of existing in either one of two distinct potential states, said plurality of electrochemical circuits comprising a plurality of spaced metallic switching electrodes mounted to extend into said container from one side thereof, a single metallic electrode spaced from said switching electrodes and common to all of said switching electrodes, said single electrode being mounted to extend into said container from another side of said container, said metal of said electrodes being selected from the electromotive series and wherein said plurality of switching electrodes and said single electrode are composed of dissimilar metals, a metallic ion-containing electrolytic solution, said electrolytic solution comprising a first group and a second group of metallic ions, said first group of metallic ions being in contact with said plurality of switching electrodes and different from and having a higher electromotive activity than the metal of said plurality of switching electrodes and said second group of metallic ions being in contact with said single electrode and similar to the metal of said single electrode, and a porous membrane positioned between said plurality of switching electrodes and said single electrode in order to maintain a separation therebetween, each of said plurality of switching electrodes and said single electrode forming a single electrochemical circuit exhibiting a first characteristic electromotive force, means for selectively applying an electric current of a desired polarity to the electrodes of said separate circuits thereby causing said separate circuits to exhibit a second characteristic electromotive force, means for reversing the direction of flow of said electric current in order to effectuate a reversal to the original polarities of said electrodes thereby causing said electrochemical circuits to revert to their first characteristic electromotive force.

4. A memory unit in accordance with claim 3 wherein said plurality of switching electrodes are composed of copper, said single electrode is composed of silver, said first group of metallic ions are zinc and said second group of metallic ions are silver.

References Cited by the Examiner

UNITED STATES PATENTS

| | | | |
|---|---|---|---|
| 2,578,898 | 12/51 | Orlik | 204—146 |
| 2,710,369 | 6/55 | Booe | 317—230 |
| 2,778,979 | 1/57 | Booe | 317—230 |
| 2,791,473 | 5/57 | Mattox | 204—146 |
| 2,848,664 | 8/58 | Critchlow | 317—231 |
| 2,890,414 | 6/59 | Snavely | 204—195 |
| 2,910,648 | 10/59 | Keller | 317—231 |
| 3,017,612 | 1/62 | Singer | 340—173 |

DAVID J. GALVIN, *Primary Examiner.*

SAMUEL BERNSTEIN, *Examiner.*